United States Patent
Rui et al.

(10) Patent No.: US 9,019,890 B2
(45) Date of Patent: *Apr. 28, 2015

(54) METHOD FOR SELECTING A POLICY AND CHARGING RULES FUNCTION SERVER ON A NON-ROAMING SCENE

(75) Inventors: Tong Rui, Shenzhen (CN); Zaifeng Zong, Shenzhen (CN); Xiaoyun Zhou, Shenzhen (CN); Jun Song, Shenzhen (CN); Jinguo Zhu, Shenzhen (CN)

(73) Assignee: ZTE Corporation (CN)

( * ) Notice: Subject to any disclaimer, the term of this patent is extended or adjusted under 35 U.S.C. 154(b) by 881 days.

This patent is subject to a terminal disclaimer.

(21) Appl. No.: 12/811,822

(22) PCT Filed: Dec. 24, 2008

(86) PCT No.: PCT/CN2008/002063
§ 371 (c)(1),
(2), (4) Date: Jul. 6, 2010

(87) PCT Pub. No.: WO2009/094837
PCT Pub. Date: Aug. 6, 2009

(65) Prior Publication Data
US 2010/0284336 A1    Nov. 11, 2010

(30) Foreign Application Priority Data

Jan. 10, 2008  (CN) .......................... 2008 1 0000437

(51) Int. Cl.
*H04W 4/00* (2009.01)
*H04M 11/00* (2006.01)
(Continued)

(52) U.S. Cl.
CPC ................. *H04W 4/24* (2013.01); *H04L 12/14* (2013.01); *H04L 12/1403* (2013.01); *H04L 12/1471* (2013.01); *H04W 40/24* (2013.01); *H04W 80/04* (2013.01)

(58) Field of Classification Search
None
See application file for complete search history.

(56) References Cited

U.S. PATENT DOCUMENTS 8,086,216 B2 * 12/2011 Feder et al. ................... 455/405

FOREIGN PATENT DOCUMENTS

| CN | 1988722 A | 6/2007 |
| CN | 101035001 A | 9/2007 |

(Continued)

OTHER PUBLICATIONS

ZTE, CR for information storage in DRA, 3GPP TSG-SA WG2 Meeting #62, Marina Del Rey, USA, Jan. 9, 2008 (retrieved on Jan. 9, 2008).*

(Continued)

*Primary Examiner* — Faruk Hamza
*Assistant Examiner* — Thinh Tran
(74) *Attorney, Agent, or Firm* — Marger Johnson & McCollom, P.C.

(57) ABSTRACT

The present invention discloses a method for selecting a policy and charging rules function server in a non-roaming scenario to achieve that the PCC policies for each IP-CAN session are determined only by one PCRF. The method comprises of a Diameter Routing Agent (DRA) establishing an association relationship table in which IP Connectivity Access Network (IP-CAN) session information and corresponding address information of a Policy and Charging Rules Function (PCRF) server are stored; and when a Policy and Charging Enforcement Function (PCEF) entity and a Gateway Control Function Entity (GWCF) requests the PCRF for or to update a Policy and Charging Control (PCC) policy of one IP-CAN session, or when an Application Function (AF) entity sends application information or service information down to the PCRF, obtaining the address information of the PCRF associated with said IP-CAN session from said DRA, then performing subsequent processing.

14 Claims, 3 Drawing Sheets

(51) Int. Cl.
*H04W 36/00* (2009.01)
*H04W 4/24* (2009.01)
*H04L 12/14* (2006.01)
*H04W 40/24* (2009.01)
*H04W 80/04* (2009.01)

(56) References Cited

FOREIGN PATENT DOCUMENTS

| | | |
|---|---|---|
| CN | 101047988 A | 10/2007 |
| CN | 101047989 A | 10/2007 |
| CN | 101060413 A | 10/2007 |
| CN | 101072170 A | 11/2007 |
| CN | 101198171 A | 6/2008 |
| CN | 101217789 A | 7/2008 |
| CN | 101217810 A | 7/2008 |
| CN | 101227391 A | 7/2008 |
| WO | WO 2004/004301 A1 | 1/2004 |
| WO | WO 2007/071651 A1 | 6/2007 |
| WO | 2007113636 A | 10/2007 |
| WO | 2007143940 A | 12/2007 |

OTHER PUBLICATIONS

Huawei, Clarification for PCRF Selection, 3GPP TSG-SA2 Meeting #62, Marina Del Rey, California, Jan. 9, 2008 (retrieved on Jan. 9, 2008).*
3GPP Organizational Partners, "3rd Generation Partnership Project; Technical Specification Group Services and System Aspects; Policy and Charging Control Architecture (Release 8)," 2007, 74 pages.*
International Search Report dated Mar. 20, 2009 for International Application No. PCT/CN2008/002063.
Ericsson, Proposal for how to progress work on PCRF discovery in cooperation with CT groups, 3GPP TSG SA WG2 Meeting #62, Marina Del Rey, California, Jan. 14-18, 2008, 2 pages.
ZTE, Issues related to the PCRF, 3GPP TSG SA WG2 Meeting #61, Ljubljana, Slovenia, Nov. 12-16, 2007, 4 pages.
Huawei, Clarifications for PCRF Selection, 3GPP TSG SA WG2 Meeting #62, Marina Del Rey, California, Jan. 14-18, 2008, 3 pages.
ZTE, PCRF selection, 3GPP TSG SA WG2 Meeting #61, Ljubljana, Slovenia, Nov. 12-16, 2007, 8 pages.
Supplementary European Search Report for European Application No. 08 87 1785, Feb. 23, 2011, 2 pages, Munich, Germany.

* cited by examiner

METHOD FOR SELECTING A POLICY AND CHARGING RULES FUNCTION SERVER ON A NON-ROAMING SCENE

TECHNICAL FIELD

The present invention relates to the mobile communication field, and particularly, to a method for selecting a policy and charging rules function server in wireless network.

BACKGROUND OF THE RELATED ART

A 3GPP Evolved Packet System (EPS) comprises an Evolved Universal Terrestrial Radio Access Network (E-UTRAN), a Mobility Management Entity (MME), a Serving Gateway (S-GW), a Packet Data Network Gateway (PDN GW), a Home Subscriber Server (HSS), a 3GPP Authorization Authentication Accounting Server (3GPP AAA Server), a Policy and Charging Rules Function (PCRF) Server and other support nodes.

Wherein, the MME is responsible for the control plane related operations, such as mobility management, the non-access layer signaling processing and management of user mobile management context and so on.

The S-GW is an access gateway equipment which connects to E-UTRAN, forwards data between the E-UTRAN and the PDN GW, and is responsible for buffering paging waiting data.

The P-GW is the border gateway of the 3GPP Evolved Packet System (EPS) and the Packet Data Network (PDN), and responsible for functions such as PDN accessing and forwarding data between EPS and PDN.

The PCRF is a policy and charging rules function entity. It interacts with an Application Function (AF, such as the interface of an IP service provided by an operator) through a Rx interface to obtain service information. Meanwhile, the PCRF connects to the gateway equipments in the network through S7/S7a/S7c to be responsible for originating the IP bearer setup, assuring the QoS of the service data, and controlling charging.

The EPS supports for intercommunication with non-3GPP network. Intercommunication with non-3GPP network is implemented by an S2a/S2b/S2c interface. And the P-GW is used as the anchor between 3GPP and non-3GPP network.

The system architecture of EPS shows in FIG. 1. Wherein, non-3GPP access networks are classified into trusted non-3GPP IP access networks and untrusted non-3GPP IP access networks i.e. non-trusted non-3GPP IP access networks. The trusted non-3GPP IP access network can interface with the P-GW through the S2a; the untrusted non-3GPP IP access networks should connect to P-GW through an Evolved Packet Data Gateway (ePDG). The interface between ePDG and P-GW is an S2b.

In traditional 3GPP networks, a Policy and Charging Enforcement Function (PCEF) only exists in the P-GW, and the PCRF can implement control of all the functions just by interfacing with the P-GW. The PCRF and the P-GW exchange information through a S7 interface (please see in FIG. 1).

However, after the 3GPP network provides the functions of intercommunicating with the non-3GPP network, if the interface between P-GW and S-GW bases on Proxy MIP (PMIP), the part of the policy enforcement function in the PCEF functions, which are called Gateway Control Function (GWCF), also exists in the S-GW, such as the bearer binding functions and so on. The S-GW and the PCRF exchange information by an S7c interface (please see in FIG. 1). When trusted non-3GPP access systems access a 3GPP network for intercommunicating, GWCF also resides in the trusted non-3GPP access gateway.

There is a plurality of PCRF nodes existing in one PLMS of the EPS. All the PCRF nodes belong to one or more Diameter (PCRF) domains (namely the PCRF Cloud in the figure), and all the PCRF in one Diameter (PCRF) domain are equivalent. One connection from a UE to a PDN network is called one IP Connectivity Access Network (IP-CAN) session. In order to ensure that the Policy and Charging Control (PCC) policies of one IP-CAN session are determined by one PCRF, the EPS introduces a logical function module of Diameter Routing Agent (DRA) into each Diameter (PCRF) domain. When a UE originates an IP-CAN session setup, the DRA selects a PCRF for this IP-CAN session.

However, in a non-roaming scenario, there is not a particular solution about how to associate all the PCEF, GWCF and AF related to one IP-CAN session with the same PCRF via DRA.

CONTENT OF THE INVENTION

The technical problems to be solved by the present invention is to provide a method for selecting a policy and charging rules function server in a non-roaming scenario to achieve that the PCC policies for each IP-CAN session are determined only by one PCRF.

To solve the above technical problems, the present invention provides a method for selecting a policy and charging rules function server in a non-roaming scenario, comprising the following steps of:

a Diameter Routing Agent (DRA) establishing an association relationship table, wherein the association relationship table stores IP Connectivity Access Network (IP-CAN) session information and corresponding address information of Policy and Charging Rules Function (PCRF) server; and when a Policy and Charging Enforcement Function entity (PCEF) and a Gateway Control Function Entity (GCFE) requesting the PCRF for or to update a Policy and Charging Control (PCC) policy related to one IP-CAN session, or when an Application Function entity (AF) sending application information or service information down to the PCRF, acquiring the PCRF address information associated with said IP-CAN session from said DRA, and then performing subsequent processing.

Furthermore, said DRA establishes the association relationship table during a process of a user equipment (UE) establishing the IP-CAN session in a non-roaming scenario.

Furthermore, the IP-CAN session information in said association relationship table established in the DRA including the following content: a user equipment identification, a user equipment IP address, and a Packet Data Network (PDN) identification.

Furthermore, the method further comprises:

(a) during the IP-CAN session setup or revision, requesting for acquiring the PCRF address from the DRA when the PCEF or the GWCF requests for the PCC policy related to the IP-CAN session from the PCRF, or when the AF sends the application information or service information down to the PCRF;

(b) the DRA searching an association relationship table stored thereon, and if said IP-CAN session is found, the DRA returning the PCRF address information associated with said IP-CAN session to the PCEF, the GWCF, or the AF, otherwise the DRA selecting a PCRF for said IP-CAN session, establishing an association relationship between said IP-CAN session and said PCRF, and returning the PCRF address information to the PCEF, the GWCF, or the AF; and (c) after acquiring the PCRF address information returned from the DRA, the PCEF, the GWCF, or the AF interacting with said PCRF to perform subsequent processing.

Furthermore, in the step (c), after acquiring the PCRF address information returned from the DRA, the PCEF, the GWCF, or the AF storing the association relationship between said IP-CAN session and said PCRF;

in the step (a), when the PCEF or the GWCF requesting for the PCC policy related to the IP-CAN session from the PCRF, or when the AF sends the application information or service information down to the PCRF, searching is performed at first, and if said IP-CAN session is found in the stored association relationship table, a PCRF associated with said session is selected, and the PCRF is interacted with to perform subsequent processing, and if said IP-CAN session is not found, the PCRF address is requested for from the DRA.

Furthermore, the association relationship table stored in the PCEF, the GWCF, and the AF includes the IP-CAN session information and corresponding PCRF address information; wherein the IP-CAN session information stored in the PCEF includes user equipment identification, user equipment IP address, and the PDN identification; the IP-CAN session information stored in the GWCF includes the user equipment identification and the PDN identification; and the IP-CAN session information stored in the AF includes the user equipment IP address and the PDN identification.

Furthermore, in said step (a), said PCEF acquires the PCRF address information from the DRA through an indicating IP-CAN session setup message, said indicating IP-CAN session setup message carrying user equipment identification, user equipment IP address, and the PDN identification, and in said step (b), said DRA uses the user equipment identification, the user equipment IP address, and the PDN identification carried in the message as searching conditions to search for the PCRF address associated with said IP-CAN session.

Furthermore, in said step (a), said GWCF acquires the PCRF address information from the DRA through a gateway control session setup message, said gateway control session setup message carrying user equipment identification and PDN identification, and in said step (b), said DRA uses the user equipment identification and the PDN identification carried in the message as searching conditions to search for the PCRF address associated with said IP-CAN session.

Furthermore, in said step (a), said AF acquires the PCRF address information from the DRA through the application information or service information, said application information or service information carrying user equipment IP address and the PDN identification, and in said step (b), said DRA uses the user equipment IP address and the PDN identification carried in the message as searching conditions to search for the PCRF address associated with said IP-CAN session.

Furthermore, when the user equipment related to said IP-CAN session locates in coverage of 3GPP, said PCEF refers to a P-GW having a PCEF function entity, and said GWCF refers to a S-GW having a GWCF function entity; when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and when the user equipment related to said IP-CAN session locates in coverage of untrusted non-3GPP, said PCEF refers to a P-GW having a PCEF function entity.

The present invention establishes association relationship tables in DRA, and has PCEF, GWCF and AF store association relationship information which is the same with that in DRA. Thus the present invention implements that all the PCEF, GWCF, and AF related to one IP-CAN session associate with the same PCRF in non-roaming scenario, in order to assure the consistency of the PCC policies.

PREFERRED EMBODIMENTS OF THE PRESENT INVENTION

Figure 1:
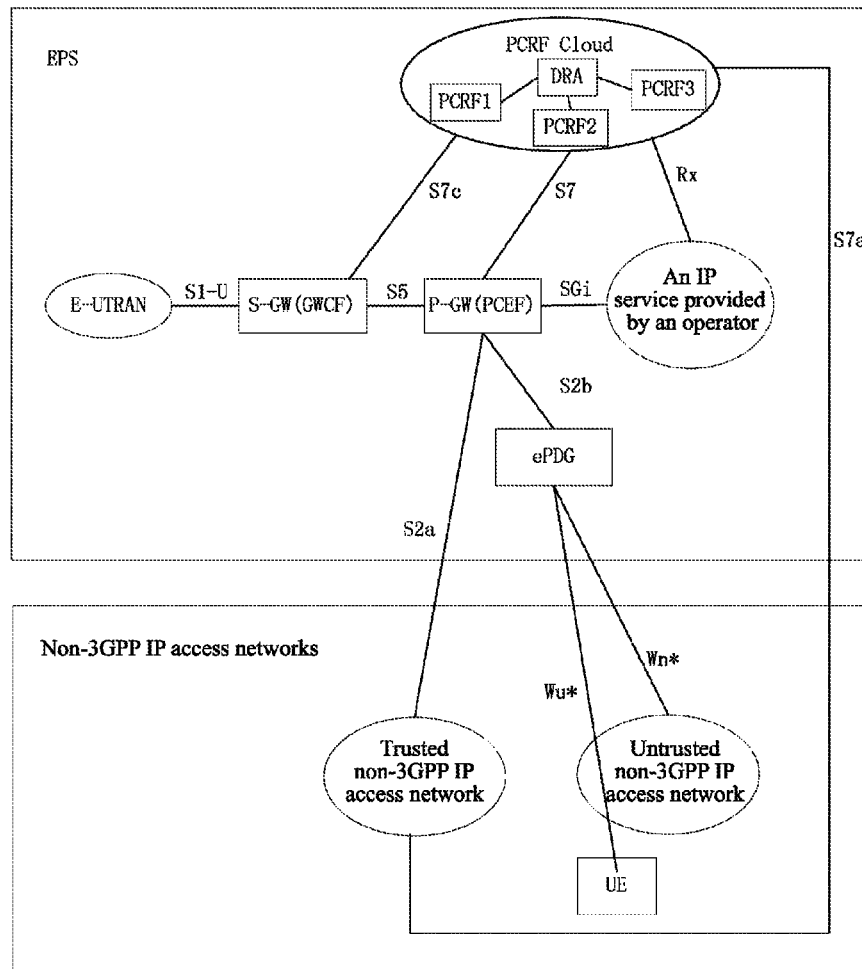
FIG. 1 is a diagram of the EPS system architecture.

The basic flow of the present invention is as follows:

Step A, when a UE originates an IP-CAN session setup in a non-roaming scenario, a PCEF or a GWCF is required to request the PCRF to send down PCC policies related to the IP-CAN session. At first, the PCEF or GWCF searches the locally stored associated information. If this IP-CAN session exists, the PCEF or GWCF selects the PCRF associated with this IP-CAN session. If this IP-CAN session does not exist, the PCEF or GWCF sends an IP-CAN session setup request to DRA.

The PCEF or GWCF may select a DRA according to the local configuration or an APN (access point name).

Step B, after receiving the information from the PCEF or GWCF, the DRA searches the locally stored association information. If this IP-CAN session exists, the DRA returns the PCRF address associated with this IP-CAN session to the PCEF or GWCF. If this IP-CAN session does not exist, the DRA selects a PCRF for this IP-CAN session and establishes an association relationship between the IP-CAN session and the PCRF, namely, the DRA stores the selection result in the local association relationship table (equivalently, the DRA binds this IP-CAN session with the allocated address of the PCRF), and returns the selected address of the PCRF to the PCEF or GWCF.

Step C, after acquiring the address of the PCRF, the PCEF or GWCF stores the address of the PCRF in the local association relationship table (binds the IP-CAN session with the PCRF address), and interacts with this PCRF for requesting for PCC policies.

Similarly, the AF also stores the association relationship table. The AF searches the locally stored association relationship table when the AF sends down service information to the PCRF. If this IP-CAN session exists, the AF selects the PCRF related to this IP-CAN session; and if this IP-CAN does not exist, the AF searches from the DRA, and the DRA returns the address of the PCRF.

The above association relationship table includes IP-CAN session information, PCRF address information (the policy and charging rules function sever address) and the corresponding relationship therebetween. Wherein, the IP-CAN session information includes one of the followings: a UE ID (user equipment identification), a UE IP address (user equipment IP address), and a PDN ID (packet data network identification). The DRA stores all the IP-CAN session information and the corresponding relationship between the IP-CAN session information and the PCRF address information. The other network elements can only store a part of above IP-CAN session information according to the information each network elements obtained, such as a GWCF (S-GW) only stores the UE ID and the PDN ID in its IP-CAN session information, an AF only stores the UE IP Address and the PDN ID in its IP-CAN session information.

According to above flow, it can be assured that all the PCEF, GWCF and AF related to one IP-CAN session are associated with the same PCRF.

When a PCEF/GWCF/AF is required to request the PCRF for or to update the PCC policies of an IP-CAN session, such as when a session is originated or a session is revised, and so on, the PCEF/GWCF/AF will search in the above association relationship table, which will be described by taking a session originating process as an example below. And the process of the PCEF, GWCF and AF when a session is revised is similar.

The Example One

Figure 2:
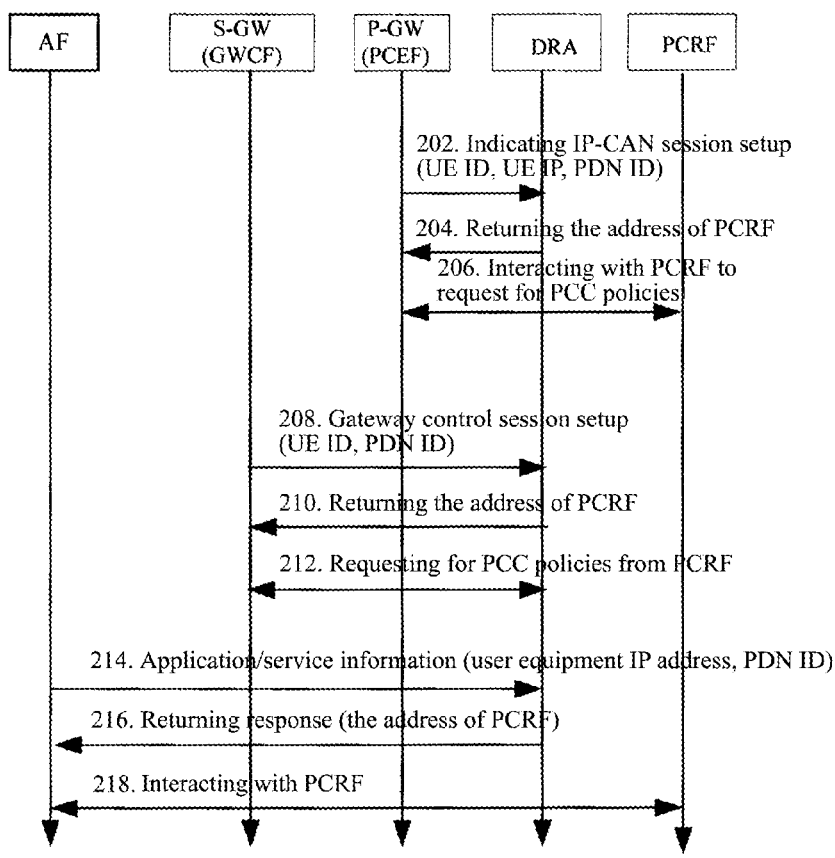
FIG. 2 is a flow chart of the first example of the present invention.

This example describes a session originating process by a UE when the UE locates in the coverage of the 3GPP, the 3GPP core network utilizes the EPC architecture, and in the EPC, the interface protocol between a S-GW and a P-GW is based on a PMIP. In the process, a UE originates a session setup request; a P-GW selects a PCRF through a DRA and stores the selection result; and then a S-GW and an AF select the same PCRF through the DRA. The flow chart of this example is shown in FIG. 2, and is illustrated as follows:

The processing flow of the P-GW is as follows:

202, before informing the PCRF of an IP-CAN session setup, the P-GW searches the locally stored association relationship table, and if the PCRF address associated with this IP-CAN session is not found, the P-GW sends a message indicating IP-CAN session setup to the DRA in order to inform the DRA of IP-CAN session setup and obtain PCRF address. The message includes a UE ID, a UE IP Address, and a PDN ID.

204, after receiving the message, the DRA uses the UE ID, UE IP Address and PDN ID included in the message as searching conditions of the IP-CAN session, and inquires the PCRF address associated with this IP-CAN session. If there is not the PCRF address associated with this IP-CAN session on the DRA at this time, the DRA selects a PCRF according to an APN (PDN ID) or other configurations, and stores the association relationship between this IP-CAN session and the PCRF. The DRA returns the PCRF address to the P-GW.

When the DRA searches the PCRF address associated with an IP-CAN session, it inquires according to one or more searching conditions, which relate to scenarios and implementations. It is not limited in present invention.

206, the P-GW stores the association relationship between this IP-CAN session and the PCRF after receiving the PCRF address, and informs the PCRF of an IP-CAN session setup. The PCRF makes associated PCC policies and sends the PCC policies down to the P-GW.

Subsequently, if the P-GW needs to interact with the PCRF in this IP-CAN session, the P-GW can find the PCRF address information associated with this IP-CAN session by inquiring local association relationship directly without needing to search from the DRA.

Actually, the above processing of the P-GW is the process of a PCEF in the P-GW.

The processing flow of the S-GW is as follows:

208, the S-GW searches the locally stored association relationship table before the S-GW sends a gateway control session setup message to a PCRF. If the PCRF address associated with this IP-CAN session is not found, the S-GW sends the gateway control session setup message to the DRA. The message includes the UE ID and the PDN ID in order to acquire the PCRF address.

Because a GWCF (S-GW) cannot acquire the UE IP, the GWCF (S-GW) only stores the UE ID and the PDN ID in the IP-CAN session information. But after the DRA receives the message from the GWCF (S-GW), the DRA can locate an IP-CAN session according to the UE ID and PDN ID, and thereby acquires the PCRF address associated with this IP-CAN session.

210, after receiving the message, the DRA uses the UE ID and PDN ID included in the message as searching conditions of the IP-CAN session to search for the PCRF address associated with this IP-CAN session. Because the DRA has stored the association relationship between this IP-CAN session and the PCRF (the process of the P-GW finished before that of the S-GW in the session originating flow) after the P-GW searched from the DRA earlier, the DRA returns the searched PCRF address information to the S-GW;

When the DRA searches the PCRF address associated with an IP-CAN session, it searches according to one or more searching conditions, which relates to scenarios and implementations. It is not limited in present invention.

212, the S-GW stores the association relationship between this IP-CAN session and the PCRF after receiving the PCRF address, and sends a gateway control session setup message to the PCRF. The PCRF makes associated PCC policies and sends the policies down to the S-GW.

Subsequently, if the S-GW needs to interact with the PCRF in this IP-CAN session, the S-GW can find the PCRF address information associated with this IP-CAN session by searching the locally stored association relationship table directly without needing to search from the DRA.

Actually, the above processing of the S-GW is the process of a GWCF in a S-GW.

The processing flow of an AF is as follows:

214, the AF searches the locally stored association relationship table before required to send application information or service information down to the PCRF, and if the PCRF address associated with this IP-CAN session is not found, the AF sends the application information or service information to the DRA in order to acquire the PCRF address, the message carrying UE IP Address and PDN ID.

Because the AF cannot acquire UE ID, the AF only stores the UE IP and PDN ID in the IP-CAN session information. But after the DRA receives the message from the AF, the DRA can locate an IP-CAN session according to the UE IP and PDN ID, and thereby acquires the PCRF address associated with this IP-CAN session.

216, after receiving the application information or service information, the DRA uses the UE IP Address and PDN ID carried in the message as searching conditions of the IP-CAN session to search for the PCRF address associated with this IP-CAN session. Because the DRA has stored the association relationship between this IP-CAN session and the PCRF, the DRA returns the searched PCRF address associated with this IP-CAN session to the AF.

When a DRA searches for the PCRF address associated with an IP-CAN session, it searches according to one or more searching conditions, which relates to scenarios and implementations. It is not limited in present invention.

218, the AF stores the association relationship between this IP-CAN session and the PCRF after receiving the PCRF address returned from the DRA, and sends the application information or service information down to the PCRF.

Subsequently, if the AF needs to interact with the PCRF in this IP-CAN session, the AF can find the PCRF address information associated with this IP-CAN session by searching the locally stored association relationship table directly without needing to search from the DRA.

The Example Two

Figure 3:
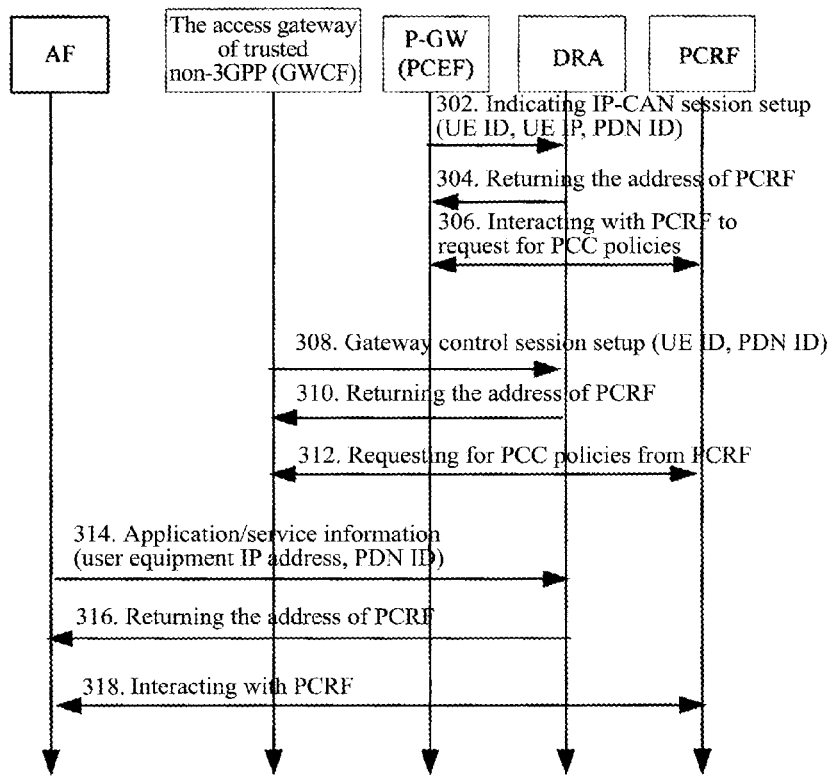
FIG. 3 is a flow chart of the second example of the present invention.

This example describes a process of a UE originating an IP-CAN session with the UE located in the coverage of trusted non-3GPP, the 3GPP core network utilizing an EPC architecture, and a MIP protocol adopted between a trusted non-3GPP access gateway and a P-GW to build a MIP tunnel. In this process, a P-GW selects a PCRF through a DRA, the DRA stores the selection result, and then a trusted non-3GPP access gateway and an AF can select the same PCRF through the DRA. The flow chart of this example is shown in FIG. 3, and each step is described as follows:

The processing flow of a P-GW is as follows:

302, a P-GW searches the locally stored association relationship table before informing a PCRF of an IP-CAN session setup. If the PCRF address associated with this IP-CAN session is not found, the P-GW sends a message indicating an IP-CAN session setup to the DRA to inform the DRA of an IP-CAN session setup and acquire a PCRF address. The session setup message includes a UE ID, a UE IP Address, and a PDN ID.

304, after receiving the message, the DRA uses the UE ID, UE IP Address, and PDN ID included in the message as searching conditions of the IP-CAN session to search the PCRF address associated with this IP-CAN session. If there is not the PCRF address associated with this IP-CAN session yet in the DRA at this time, the DRA selects a PCRF for the IP-CAN session according to an APN (PDN ID) or other configurations, stores the association relationship between this IP-CAN session and the PCRF, and returns the PCRF address to the P-GW.

306, the P-GW stores the association relationship between this IP-CAN session and the PCRF after receiving the PCRF address, and informs the PCRF of an IP-CAN session setup. The PCRF makes corresponding PCC policies and sends the PCC policies down to the P-GW.

Subsequently, if the P-GW is required to interact with the PCRF in this IP-CAN session, the P-GW can find the PCRF address information associated with this IP-CAN session by searching the locally stored association relationship table without needing to search from the DRA.

Actually, the above processing of a P-GW is the process of a PCEF in a P-GW.

The processing flow of a trusted non-3GPP access gateway is as follows:

308, a trusted non-3GPP access gateway searches the locally stored association relationship table before it sends a gateway control session setup message to a PCRF. If the PCRF address associated with this IP-CAN session is not found, the trusted non-3GPP access gateway sends the gateway control session setup message to a DRA in order to acquire the PCRF address. The gateway control session setup message includes an UE ID and a PDN ID.

310, after receiving the message, the DRA uses the UE ID and the PDN ID included in the message as searching conditions of the IP-CAN session to search for the PCRF address associated with this IP-CAN session. Because when the P-GW searched from the DRA earlier, the DRA has stored the association relationship of this IP-CAN session and the PCRF, the DRA returns the searched PCRF address information to the trusted non-3GPP access gateway.

312, the trusted non-3GPP access gateway stores the association relationship between this IP-CAN session and the PCRF after the trusted non-3GPP access gateway receives the PCRF address, and sends a gateway control session setup message to the PCRF. The PCRF makes corresponding PCC policies and sends the PCC policies down to the trusted non-3GPP access gateway.

Subsequently, if the trusted non-3GPP access gateway is required to interact with the PCRF in this IP-CAN session, the trusted non-3GPP access gateway can finds the PCRF address information associated with this IP-CAN session by searching the locally stored association relationship table directly without needing to search from the DRA.

The processing flow of an AF is as follows:

314, the AF searches the locally stored association relationship table before AF sends application information or service information down to the PCRF. If the PCRF address associated with this IP-CAN session is not found, the AF sends the application information or service information to the DRA in order to acquire a PCRF address. The information includes an UE IP Address and a PDN ID.

316, after receiving the information, the DRA uses the UE IP Address and the PDN ID included in the information as searching conditions of the IP-CAN session to search for the PCRF address associated with this IP-CAN session. Because the DRA has stored the association relationship between this IP-CAN session and the PCRF, the DRA returns the searched PCRF address associated with this IP-CAN session to the AF.

318, the AF stores the association relationship of this IP-CAN session and the PCRF after receiving the PCRF address returned from the DRA, and sends the application information or service information down to the PCRF.

Subsequently, if AF is required to interact with the PCRF in this IP-CAN session, the AF can find the PCRF address information associated with this IP-CAN session by searching the locally stored association relationship table without needing to search from the DRA.

The Example Three

Figure 4:
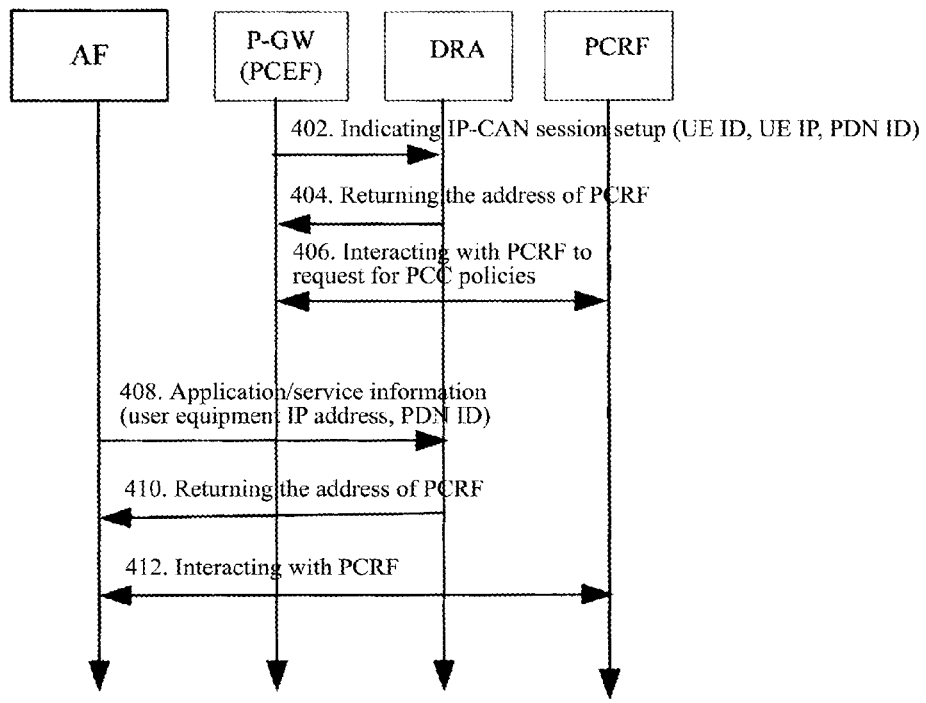
FIG. 4 is a flow chart of the third example of the present invention.

This example describes a process of a UE originating an IP-CAN session with the UE located in untrusted on-3GPP coverage and the 3GPP core network adopting an EPC architecture. In this process, a P-GW selects a PCRF through a DRA, and the DRA stores the selection result. Then an AF selects the same PCRF through the DRA. The flow chart of this example is shown in FIG. 4, and the illustration of each step is as follows:

402, a P-GW searches the locally stored association relationship table before informing a PCRF of an IP-CAN session setup. If the PCRF address associated with this IP-CAN session is not found, the P-GW sends a message indicating IP-CAN session setup to the DRA in order to inform the DRA of an IP-CAN session setup and acquire a PCRF address. The IP-CAN session setup message includes an UE ID, an UE IP Address, and a PDN ID.

404, after receiving the message, the DRA uses the UE ID, the UE IP Address, and the PDN ID included in the message as searching conditions of an IP-CAN session to search for the PCRF address associated with this IP-CAN session. If there is not the PCRF address associated with this IP-CAN session yet in the DRA at this time, the DRA selects a PCRF for the IP-CAN session according to an APN (PDN ID) or other configurations, stores the association relationship between this IP-CAN session and the PCRF, and returns the PCRF address to the P-GW.

406, the P-GW stores the association relationship between this IP-CAN session and the PCRF after receiving the PCRF address, and informs the PCRF of an IP-CAN session setup.

The PCRF makes corresponding PCC policies and sends the PCC policies down to the P-GW.

Subsequently, if the P-GW is required to interact with the PCRF in this IP-CAN session, the P-GW can find the PCRF address information associated with this IP-CAN session by searching the locally stored association relationship table directly without needing to search from the DRA.

Actually, the above processing of a P-GW is the processing of a PCEF in a P-GW.

The processing flow of an AF is as follows:

408, the AF searches the locally stored association relationship table before sending application information or service information down to a PCRF. If the PCRF address associated with this IP-CAN session is not found, the AF sends the application information or service information to the DRA in order to acquire the PCRF address. The information includes the UE IP Address and the PDN ID.

410, after receiving the information, the DRA uses the UE IP Address and the PDN ID included in the information as searching conditions of the IP-CAN session to search for the PCRF address associated with this IP-CAN session. Because the DRA has stored the association relationship between this IP-CAN session and the PCRF, the DRA returns the PCRF address associated with this IP-CAN session to the AF.

418, the AF stores the association relationship between this IP-CAN session and the PCRF after receiving the PCRF address returned from the DRA, and sends the application information or service information down to the PCRF.

Subsequently, if the AF is required to interact with the PCRF in this IP-CAN session, the AF can find the PCRF address information associated with this IP-CAN session by searching the locally stored association relationship directly without needing to search from the DRA.

Certainly, the present invention may have many other embodiments. It is understood for the skilled in the art that various modifications and variations may be made without deviating from the spirit and scope of the invention, which all are covered by the scope of the claims attached.

For example, the PCEF, GWCF or AF may not store the association relationship, but acquire the association relationship from the DRA when it is needed.

INDUSTRIAL APPLICABILITY

The present invention establishes association relationship tables in the DRA, and has the PCEF, GWCF and AF store the association relationship information, which is the same with that in the DRA. Thus the present invention implements that all the PCEF, GWCF and AF related to one IP-CAN session associate with the same PCRF in a non-roaming scenario, in order to assure the consistency of the PCC policies.

The invention claimed is:

1. A method for selecting a policy and charging rules function server in non-roaming scenario, comprising the following steps of:
   a Diameter Routing Agent (DRA) establishing an association relationship table, wherein the association relationship table stores IP Connectivity Access Network (IP-CAN) session information and corresponding Policy and Charging Rules Function server (PCRF) address information; and
   when a Policy and Charging Enforcement Function entity (PCEF) requests a PCRF for or to update a Policy and Charging Control (PCC) policy related to one IP-CAN session, acquiring the PCRF address information associated with said IP-CAN session from said DRA, then sending a message to the PCRF corresponding to the acquired PCRF address information for requesting the PCC policy related to said IP-CAN session, and the PCRF sending the PCC policy to the PCEF;
   when a Gateway Control Function Entity (GWCF) requests for or to update the PCC policy related to said IP-CAN session, acquiring the PCRF address information associated with said IP-CAN session from said DRA, then sending a message to the PCRF corresponding to the acquired PCRF address information for requesting the PCC policy related to said IP-CAN session, and the PCRF sending the PCC policy to the GWCF;
   when an Application Function entity (AF) sends application information or service information related to said IP-CAN session, acquiring the PCRF address information associated with said IP-CAN session from said DRA, then sending the application information or service information down to the PCRF corresponding to the acquired PCRF address information;
   wherein, the step of acquiring the PCRF address information associated with said IP-CAN session from said DRA comprises:
   the DRA searching the association relationship table stored thereon, and if said IP-CAN session is found, the DRA returning the PCRF address information associated with said IP-CAN session to the PCEF, the GWCF, or the AF, otherwise the DRA selecting one PCRF for said IP-CAN session, establishing an association relationship between said IP-CAN session and said one PCRF, and returning the PCRF address information to the PCEF, the GWCF, or the AF;
   after the step of acquiring the PCRF address information associated with said IP-CAN session from said DRA, further comprising:
   the PCEF, the GWCF, or the AF storing a local association relationship table including the IP-CAN session information and corresponding PCRF address information associated with the IP-CAN session information; and
   the method further comprises:
   when the PCEF requests a PCRF for or to update a Policy and Charging Control (PCC) policy related to one IP-CAN session, first searching the local association relationship table stored thereon, and if said IP-CAN session is found in the local association relationship table, acquiring the PCRF address information associated with said IP-CAN session from the local association relationship table;
   when the GWCF requests for or to update the PCC policy related to said IP-CAN session, first searching the local association relationship table stored thereon, and if said IP-CAN session is found in the local association relationship table, acquiring the PCRF address information associated with said IP-CAN session from the local association relationship table;
   when the AF sends application information or service information related to said IP-CAN session, first searching the local association relationship table stored thereon, and if said IP-CAN session is found in the local association relationship table, acquiring the PCRF address information associated with said IP-CAN session from the local association relationship table.

2. The method as claimed in claim 1, wherein, said DRA establishes the association relationship table during a process of a user equipment (UE) establishing the IP-CAN session in a non-roaming scenario.

3. The method as claimed in claim 2, wherein,
the IP-CAN session information in said association relationship table established in the DRA including the following content: a user equipment identification, a user equipment IP address, and a Packet Data Network (PDN) identification.

4. The method as claimed in claim 3, wherein,
when the user equipment related to said IP-CAN session locates in coverage of 3GPP, said PCEF refers to a P-GW having a PCEF function entity, and said GWCF refers to a S-GW having a GWCF function entity;
when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and
when the user equipment related to said IP-CAN session locates in coverage of untrusted non-3GPP, said PCEF refers to a P-GW having a PCEF function entity.

5. The method as claimed in claim 2, wherein,
when the user equipment related to said IP-CAN session locates in coverage of 3GPP, said PCEF refers to a P-GW having a PCEF function entity, and said GWCF refers to a S-GW having a GWCF function entity;
when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and
when the user equipment related to said IP-CAN session locates in coverage of untrusted non-3GPP, said PCEF refers to a P-GW having a PCEF function entity.

6. The method as claimed in claim 1, wherein,
the IP-CAN session information stored in the local association relationship table of the PCEF includes user equipment identification, user equipment IP address, and the PDN identification;
the IP-CAN session information stored in the local association relationship table of the GWCF includes the user equipment identification and the PDN identification; and
the IP-CAN session information stored in the local association relationship table of the AF includes the user equipment IP address and the PDN identification.

7. The method as claimed in claim 6, wherein,
when the user equipment related to said IP-CAN session locates in coverage of 3GPP, said PCEF refers to a P-GW having a PCEF function entity, and said GWCF refers to a S-GW having a GWCF function entity;
when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and
when the user equipment related to said IP-CAN session locates in coverage of untrusted non-3GPP, said PCEF refers to a P-GW having a PCEF function entity.

8. The method as claimed in claim 1, wherein,
the step of the PCEF acquiring the PCRF address information associated with said IP-CAN session from said DRA comprises: said PCEF acquiring the PCRF address information from the DRA through an indicating IP-CAN session setup message, wherein, said indicating IP-CAN session setup message includes user equipment identification, user equipment IP address, and PDN identification; and
the step of the DRA searching the association relationship table stored thereon comprises: said DRA using the user equipment identification, the user equipment IP address, and the PDN identification included in the indicating IP-CAN session setup message as searching conditions to search for the PCRF address information associated with said IP-CAN session.

9. The method as claimed in claim 8, wherein,
when the user equipment related to said IP-CAN session locates in coverage of 3GPP, said PCEF refers to a P-GW having a PCEF function entity, and said GWCF refers to a S-GW having a GWCF function entity;
when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and
when the user equipment related to said IP-CAN session locates in coverage of untrusted non-3GPP, said PCEF refers to a P-GW having a PCEF function entity.

10. The method as claimed in claim 1, wherein,
the step of the GWCF acquiring the PCRF address information associated with said IP-CAN session from said DRA comprises: said GWCF acquiring the PCRF address information from the DRA through a gateway control session setup message, wherein, said gateway control session setup message includes user equipment identification and PDN identification; and
the step of the DRA searching the association relationship table stored thereon comprises: said DRA using the user equipment identification and the PDN identification included in the gateway control session setup message as searching conditions to search for the PCRF address information associated with said IP-CAN session.

11. The method as claimed in claim 10, wherein,
when the user equipment related to said IP-CAN session locates in coverage of 3GPP, said PCEF refers to a P-GW having a PCEF function entity, and said GWCF refers to a S-GW having a GWCF function entity;
when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and
when the user equipment related to said IP-CAN session locates in coverage of untrusted non-3GPP, said PCEF refers to a P-GW having a PCEF function entity.

12. The method as claimed in claim 1, wherein,
the step of the AF acquiring the PCRF address information associated with said IP-CAN session from said DRA comprises: said AF acquires the PCRF address information from the DRA through the application information or service information, wherein, said application information or service information includes user equipment IP address and PDN identification; and
the step of the DRA searching the association relationship table stored thereon comprises: said DRA using the user equipment IP address and the PDN identification included in the application information or service information as searching conditions to search for the PCRF address information associated with said IP-CAN session.

13. The method as claimed in claim 12, wherein,
when the user equipment related to said IP-CAN session locates in coverage of 3GPP, said PCEF refers to a P-GW having a PCEF function entity, and said GWCF refers to a S-GW having a GWCF function entity;

when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and when the user equipment related to said IP-CAN session locates in coverage of untrusted non-3GPP, said PCEF refers to a P-GW having a PCEF function entity.

14. The method as claimed in claim 1, wherein, when the user equipment related to said IP-CAN session locates in coverage of 3GPP, said PCEF refers to a P-GW having a PCEF function entity, and said GWCF refers to a S-GW having a GWCF function entity;

when the user equipment related to said IP-CAN session locates in coverage of trusted non-3GPP, said PCEF refers to a P-GW having a PCEF function entity, and said GWCF refers to a trusted non-3GPP access gateway having a GWCF function entity; and when the user equipment related to said IP-CAN session locates in coverage of untrusted non-3GPP, said PCEF refers to a P-GW having a PCEF function entity.

\* \* \* \* \*